United States Patent [19]

Hayden

[11] Patent Number: 5,043,699
[45] Date of Patent: Aug. 27, 1991

[54] COMPACT TWO-PIN FLASHER SWITCH

[75] Inventor: Rodney Hayden, Stoney Creek, Canada

[73] Assignee: Atoma International Inc., Newmarket, Canada

[21] Appl. No.: 494,410

[22] Filed: Mar. 16, 1990

[30] Foreign Application Priority Data

Mar. 30, 1989 [CA] Canada ................................. 595229

[51] Int. Cl.5 ............................................. B60Q 1/34
[52] U.S. Cl. .................................. 340/475; 340/438; 315/200 A
[58] Field of Search ....................... 340/475, 438, 641; 315/200 R, 200 A

[56] References Cited

U.S. PATENT DOCUMENTS 3,246,181 4/1966 Bleiweiss et al. .................. 340/475
3,611,288 10/1971 Little et al. ......................... 340/475

Primary Examiner—Donnie L. Crosland
Attorney, Agent, or Firm—Blake, Cassels & Graydon

[57] ABSTRACT

An automotive flasher switch having two terminal pins is disclosed. A relay having a conductive yoke and having a conductive, spring mounted armature, is connected to one terminal. A contact, supported by the armature, intermittently engages the other terminal during cycling of the relay. During cycling of the relay, current passes along a conductive path in the relay. A circuit board, having a timing assembly, functions to determine the cycling frequency and duration of the relay contact operation. An integrated chip may be provided to provide protective safeguards for the circuit. A deflecting plate or buzzer may be incorporated to enhance the audible signal generated during cycling.

11 Claims, 2 Drawing Sheets

COMPACT TWO-PIN FLASHER SWITCH

BACKGROUND

1. Field of the Invention

This invention relates to two-pin electromagnetic flasher switches which can be utilized in automotive applications.

2. Background of the Invention

Flasher switches of various designs have been made in the past each of which have certain inherent disadvantages. Thermal flasher switches incorporating a bi-metal construction designed to be activated upon resistance heating and expansion of metal components continue to be in frequent use. Such units are popular due to relatively low cost of manufacture. Other disadvantages such as temperature sensitivity and limited lifespan make thermal switches less favourable in a wide variety of heavy duty applications such as in trucks. Other flasher switches of the electro-mechanical type, including the switch disclosed in U.S. Pat. No. 3,611,288, incorporate a number of moving parts, are generally heavy and are relatively costly to manufacture and suffer from other disadvantages.

Flasher switches of known design incorporating single throw relays have generally been of two basic designs, that is, having either a two-pin or three-pin configuration. Similarly, such flasher switches have been designed for operation under either fixed load or variable load conditions. These known flasher switches were not suitable for or capable of being readily adapted for use in such differing applications without substantially adversely affecting cost and size considerations.

Flasher switch designs of the two pin type are commonly used in heavy duty applications in heavy transportation and construction vehicles such as trucks. Many original equipment manufacturers (OEM's) have specified flasher switches of the two-pin type On the otherhand, although many passenger car OEM's have featured three pin flasher switches, there is a demand for two pin flashers which may be used for after market replacement of failed original equipment of the three-pin type.

Flasher switches designed for fixed load applications, particularly for use in connection with turn signal circuits, when used in connection with multiple lamps, typically indicate an outage by maintaining the circuit in the closed position and continuously lighting all remaining operative lamps. In passenger cars for example, upon failure of one or more turn signal lamps, there is a lowering of the load on the flasher switch circuit which prevents the relay component of the flasher switch from being activated to commence flashing of the remaining turn signal lamps.

Variable load flasher switches are commonly used in hazard warning light circuits in passenger car motor vehicles and heavy trucks. Generally, it is essential that hazard warning lights be capable of operation even if one or more lamps operated on the circuit have failed. Similarly, manufacturers and operators of heavy-duty vehicles such as trucks commonly specify variable load flashing switches which are capable of operating turn signals even where one or more lamps are inoperative without significantly adversely affecting the flashing or cycling frequency of the remaining lamps In applications involving trucks, it is not uncommon for as many as 16 lams to be operated on each of both turn signal circuits.

Other design parameters for flashers are typically specified by OEM's and those parameters are indeed important in the selection of suitable flasher switches to meet those requirements. One such parameter is the maximum elapsed time of operation of the switch from activation to the time of the first flash of the lamps in operation. It is generally desirable that the flasher switch exhibit a relatively low elapsed time to the first flash to increase visibility under high speed operation on highways and the like. A second important parameter is the frequency of flashing which also must be maintained within a specified range. Frequencies which are either too low or too high make the flasher switches undesirable for use. A third factor is the percentage of time on during duty cycle which is a measure of the time that the lamps remain lighted during a full cycle. Other important design parameters are the durability of the switches, including the number of cycles expected under normal operating conditions and resistance to shock and dirt damage.

The audibility of a flasher switch during operation is also a relatively important design parameter. Operators of noisy, heavy equipment, and passenger cars, find it desirable if the flasher switch generates a relatively loud noise sufficient to be audible over a range of wind noise, engine and other noises encountered during vehicle operation.

Flashers developed for after-market installation in older vehicles have typically incorporated 2 pin configurations. Flasher assembles of the 3 pin type could not be readily installed in such older vehicles without first making modifications to other existing vehicle components.

In the prior art, electronic flashers have heretofore incorporated 3 pin configurations, the third pin being a ground pin. According to the present invention, a two pin electronic flasher assembly is provided which may be readily incorporated into new, original vehicle applications and into after market installations. Electronic flashers of the present invention may be adapted to fit existing receptacles having 2 pin or 3 pin flasher configurations as the need for a third ground pin has been eliminated.

SUMMARY OF THE INVENTION

According to the present invention, it is possible to provide a reliable electronic flasher switch assembly manufactured from standardized components at relatively low cost. The flasher described herein may be manufactured for use in different applications and using fewer components to overcome disadvantages associated with flasher switches of known design.

It is a further aspect of the present invention that the above described circuit may be readily adapted to provide a compact, resilient and durable flasher switch suitable for heavy duty use in automotive vehicles.

BRIEF DESCRIPTION OF THE DRAWINGS

Specific embodiments of the present invention will be described with reference to the following drawings.

DETAILED DESCRIPTION OF PREFERRED EMBODIMENTS

Figure 1:
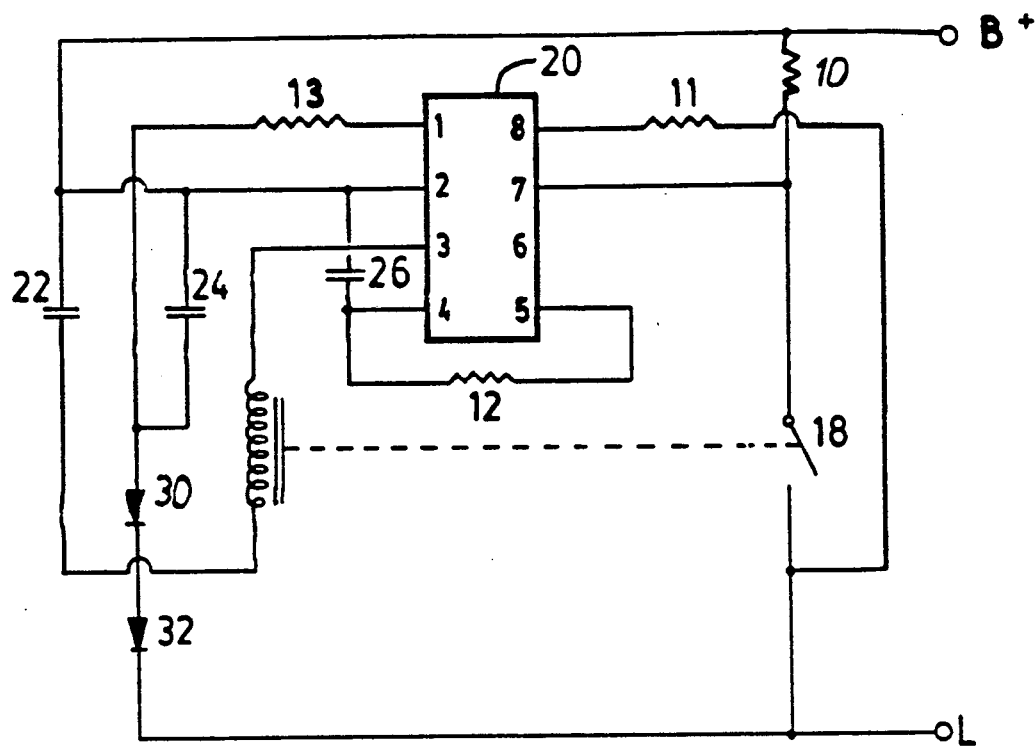
FIG. 1 is a schematic drawing of a variable load flasher switch circuit.

With reference to FIG. 1, a diagramatic representation of one embodiment of the present invention is shown. The circuit diagram for a two-pin flasher switch shows a positive source or connection B and a lamp load L. Positive source B may be connected to the positive terminal of an automotive battery source (not shown) It is to be understood that in accordance with the present invention, switching means (not shown) will be present intermediate of the load L and the flasher switch circuit, and that such switching means may include switches of the 4-way hazard warning light type or of the directional turn signal type as will be further described below.

The lamp load L will vary according to the number and types of operative automotive lamps connected in the installed circuit. It has been found that using embodiments of the present invention, it has been possible to satisfactorily operate sixteen running light lamps on one flasher circuit at one time. In addition to to other advantages, it has been found that the operating life of the present flasher switch is substantially longer than that of conventional switches.

With reference to FIG. 1, positive source B is connected to a relatively low resistance shunt 10. Shunt 10 is connected to both a relay contact 18 and a terminal 7 on an integrated chip 20. Integrated chip 20 may be of a type readily available to the automotive parts manufacturing industry, such as model number UAA 1041 manufactured by Motorola Semiconductor Products Division of Motorola Limited. As described herein, chip 20 may be of a type providing overvoltage protection, fault detection and other protective features. Terminal 7 is a fault detector pin for detection of, for example, a shorted lamp socket. If a shorted lamp socket is present in the circuit a lower voltage is sensed at this terminal and the signal switch operation is prevented. Terminal pin 6 acts as an on-off switch for the fault detector feature. Where, as shown, terminal 6 is not connected to a positive voltage source, the fault detector feature is in the on-position. Where this feature is not desired, the terminal pin 6 should be connected to a positive voltage source. It is noted that any connection of terminal 6 to ground (negative) will result in the virtuallY immediate destruction of the chip. It is to be understood that such a feature is possible with fixed load flasher switches where a unit will be designed to operate only when all of a specified number of lamps are functional. In applications where a variable load flasher switch is desirable, such a fault detection feature is not possible as it is inherently required that all remaining functional lamps be permitted to flash upon activation of the switch. Positive source B is connected to positive terminal 2 on the chip 20 and source B is further connected to three capacitors 22, 24, 26 of differing sizes. In a preferred embodiment capacitors 22, 24 are rated at 2000 and 1000 uf (microfarads) respectively with capacitor 26 being rated at 1 uf. It has been found to be preferential to use two smaller rated capacitors 22, 24 although it is to be understood that a single, larger capacitor may also be utilized. Where it is desirable to do so, it is generally found that 2 smaller capacitors can be so positioned as to reduce the overall size of the flasher switch device.

Capacitor 22 is connected pin 2 and to diode 32 which diode acts to suppress discharge of capacitor 22 across the lighting circuit, namely, the load L. Diode 32 is connected to resistor 11 which is in turn connected to sensing terminal pin 8 on the chip 20. Pin 8 acts as a sensor for detection of the closure of relay contact 18 through detection of a voltage across resistor 11. Diode 30 serves a similar purpose by acting as a gate to suppress discharge of capacitor 24 across the lighting circuit. Relay coil 40 is in turn connected to a corresponding terminal pin 3 on chip 20. Relay coil 40 cooperates with other components of a relay, including an armature 48 connected to relay contact 18. As may be readily understood, and as described further below, upon induction of a magnetic field about relay coil 40, armature 48 is activated through magnetic attraction thereby closing the relay contact 18. As shown, capacitor 24 is connected in parallel to suppressor diode 30 as previously described and to a resistor 13. Resistor 13 is in turn connected to terminal 1 on chip 20, terminal 1 being the ground or negative contact pin for the chip 20.

Capacitor 26, which in conjunction with resistor 12 functions as a timer circuit, is connected in parallel to terminal pin 4 and resistor 12 which resistor is in turn connected to terminal pin 5 of the chip 20. The flash rate of the flasher switch circuit is a function of the features of the capacitor 26 and resistor 12. The capacitance rating of the capacitor 26 determines the time off of lights operating on the flasher circuit and the corresponding resistance rating of resistor 12 determines the on time of such lights. It has been found that a very substantial improvement in flasher switch operation is experienced when capacitor 26 is selected within a range of 1 uf to 4.7 uf for corresponding resistances of 430 kohms to 200 kohms in resistor 12.

Figure 2:
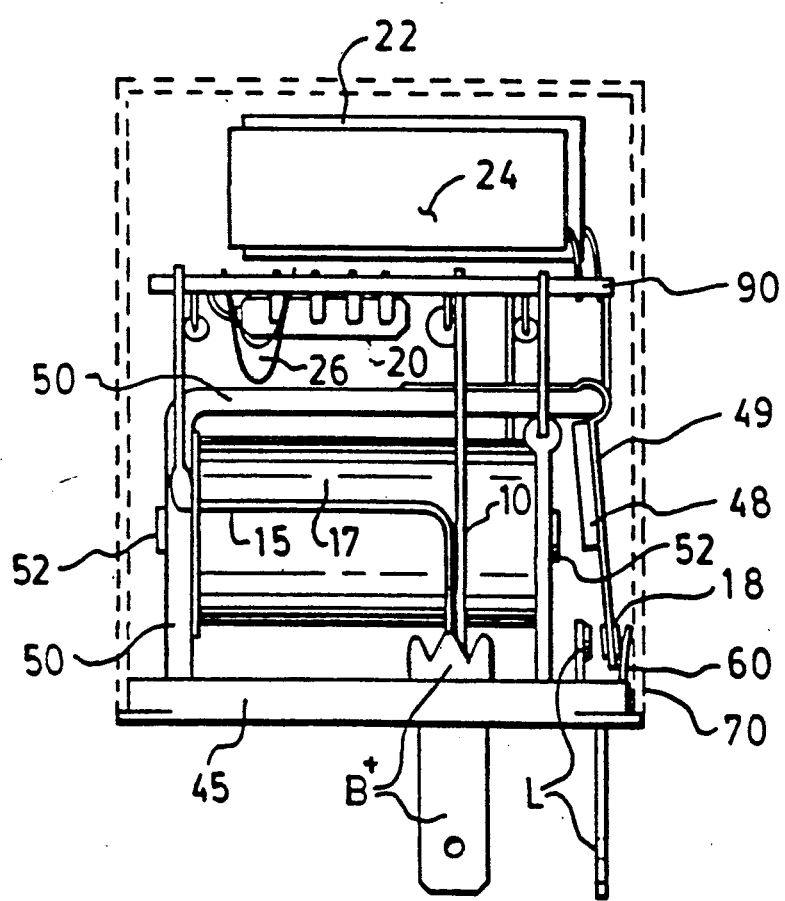
FIG. 2 shows various components of a flasher switch assembly of the present invention.

The operation of the flasher switch assembly through a complete cycle may be described in generalized terms as follows. With reference to FIG. 2, and FIG. 1, upon activation of a switch such as a directional turn signal switch or a hazard warning light switch (not shown), a voltage is sensed at sensing pin 8. Timing capacitor 26 is charged and once charged to capacity, relay coil 40 is energized, inducing a magnetic field to activate armature 48, thereby closing contact 18. Upon closing contact 18, reversal in polarity is sensed at terminal 8 causing the capacitor 26 to discharge. Upon discharge of the capacitor, the drop out of relay voltage sensed at terminal 4 continues until the relay contact is again opened. To provide a variable load flasher switch, modifications to the flasher circuit must be made. With reference to FIG. 1, resistor 10 must be a relatively low resistance connector, commonly known in the art as a jumper. With a variable load flasher, it is not possible to utilize any overload protection provided in integrated chips as it is not possible to specify the number of lights that may not be operative at any time. However, it can be appreciated that it is relatively simple to substitute a jumper for a shunt in a manufacturing process thereby simplifying any changeovers during production runs.

Figure 3:
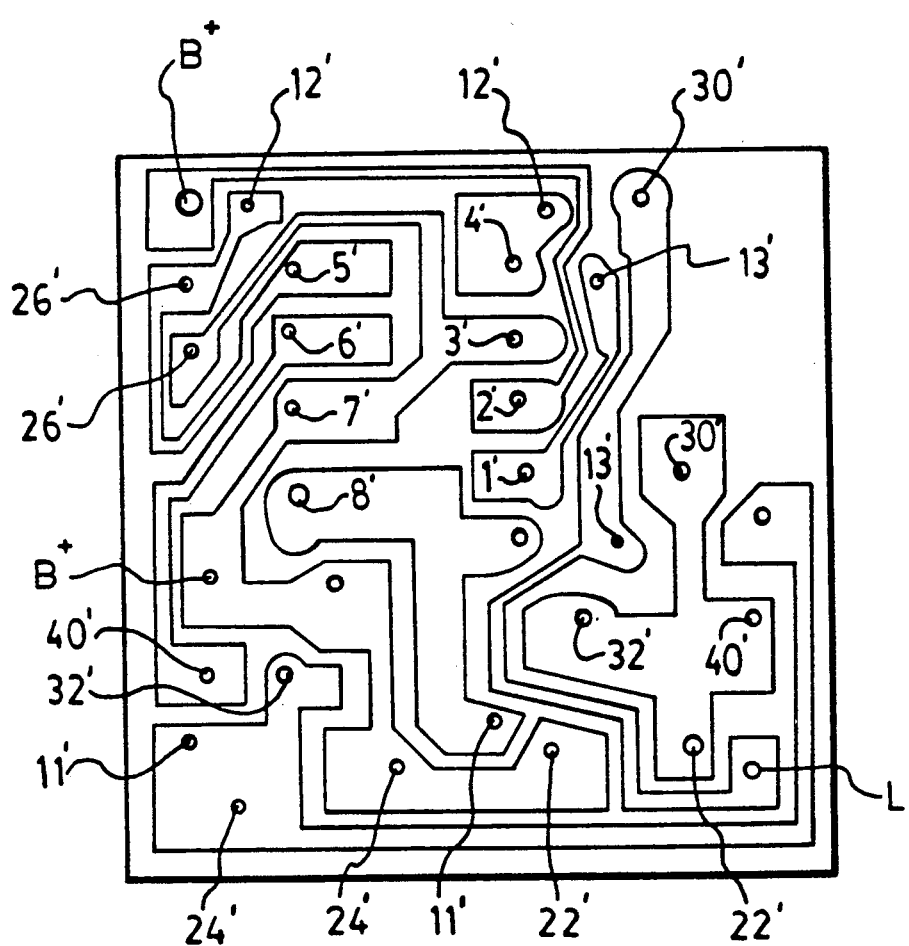
FIG. 3 illustrates a typical printed circuit board use in a flasher switch.

In the embodiment of the present invention shown in FIG. 2, it is possible to utilize a printed circuit board 90 of a readily available type as shown in FIG. 3. FIG. 2 shows such a typical circuit board with various of the pre-drilled bores being labelled according to the corresponding component to be housed in each such bore. It should be noted that in FIG. 2, pin 6 of chip 20 is shown as being connected to a positive source thereby inactivating the fault detection feature.

In the assembly of the various components of the flasher switch device as shown in FIG. 3, it may be desirable to assemble the relay component by mounting the relay component on a base 45 of suitable material such as plastic. The relay will typically include a wound coil secured about a magnetizable core 52, the core 52 and coil 17 being secured in conductive yoke 50. The base 45 securely holds two pins, a positive terminal B+ and a ground terminal L for the overall assembly. The armature 48 may be mounted by means of a conductive spring 49 fastened on the yoke and at its far end supports a contact 18 for corresponding engagement with the ground pin L.

A conductive member such as a shunt 10 is fastened to the positive pin B+ and is also fastened to the circuit board 90 by soldering or other suitable means. The resistance of the shunt predetermines the lamp load which may be operated by the flasher switch and it is thereby possible to have a fixed load flasher with a shunt of predetermined resistance or a variable load flasher with a conductive member of nominal resistance. A conductive connector 15 is also used to electrically connect terminal B+ to the yoke 50. The shunt also acts as one of several supports for the circuit board assembly component. The circuit board assembly may be assembled in a series of steps prior to its connection to the relay and base assembly. The chip 20, diodes, resistors and capacitor 26 may all be soldered or otherwise secured into place prior to assembly with the relay and base assembly. It is expected that the circuit board assembly may be substantially completed except to the extent that the one or two larger capacitors 22 and 24 may be mounted after the relay and base assembly is connected to the remainder of the circuit board assembly. Once those steps are complete, the larger capacitors may be mounted into place by soldering, for example. It has been found that desirable characteristics are achieved when the larger capacitors are mounted on a first, upper side of the circuit board, and the remaining components including the remaining timing capacitor, chip, resistors and diodes are mounted on the second, lower side of the circuit board intermediate of the circuit board and relay-base assembly. Ease of manufacturing and space saving advantages have been recognized as a result of such component orientations.

The flasher switch assembly of the present invention provides a further advantage over conventional flasher switches in that the circuit provides for current loading through the relay itself rather than the circuit board. This provides for an improved current loading capacity in that the entire assembly of the present invention is not as greatly limited by the typically lower circuit board capacity. Flasher switches of conventional design have, for space saving and other reasons, mounted the relay component on the circuit board such that the circuit board componentry must carry current loadings between the terminal pins supported in the base. That is, such earlier designs have provided for circuit board componentry to be intermediate of the relay components and the terminals of the base. Heavy current loadings on such designs have resulted in premature failure of flasher switches under moderate loadings. However, flasher switch assemblies of the present invention, utilizing 40 ampere rated relay components have satisfactorily serviced 16 truck lights on one turn signal circuit.

In a preferred embodiment of the present invention, an audible signal indicator may be added to improve driver detection of flasher operation. In a first embodiment as shown in FIG. 2, a reverse bent back stop 60 may be angled to form a slight gap between its distal end and the outer protective casing or enclosure of the assembled flasher switch. Upon cycling of the relay, the relay contact will alternate between contacting the load terminal of the base and the extended portion of the backstop. Upon impact of the contact with the deflectable number or backstop, deflection will occur causing the reverse bent portion to strike the protective casing 70. For example, when the reverse bent backstop is made of a metallic material and the casing of a resilient plastic, it is found that audible turn signal indication characteristics are enhanced. Alternatively, in yet another embodiment (not shown), a piezo-electric buzzer or noise maker may be added to the circuit board to be activated upon cycling of the flasher circuit. It is understood that other suitable locations may be found for placement of the buzzer.

Although specific examples and preferred embodiments have been expressly disclosed herein, it is understood tht other embodiments and variations may be utilized without departing from the scope of the present invention.

I claim:

1. A flasher switch operable with a DC power source, comprising:
   (a) a base;
   (b) a pair of terminal pins; the first pin being a positive terminal adapted for connection to a positive source receptacle and the second pin being a load terminal adapted for connection to a load source receptacle; said pins being secured to the base;
   (c) relay means supported on the base, said relay means comprising a biased contact means operable between first and second positions wherein in the first position said contact is biased away from said load terminal; and said contact is adapted to electrically contact said load terminal in said second position upon magnetization of the relay means;
   (d) said relay means being adapted to conduct current between said terminals upon movement of the contact to the second position;
   (e) a circuit board assembly being electrically connected to said terminal pins; said circuit board assembly comprising a first capacitor for inducting the relay means through the load terminal; said circuit board assembly being adapted to control the frequency and duration of said contact being in said second position;
   (f) a conductive member of preselected resistance adapted to conduct current between said circuit board assembly and said positive terminal; and
   (g) enclosure means secured to the base and adapted to substantially protect the relay means and circuit board assembly against dirt and moisture.

2. A flasher switch as claimed in claim 1, wherein the circuit board assembly comprises an integrated chip electrically connected to a timing capacitor and a timing resistor, said timing capacitor and timing resistor being connected in series.

3. A flasher switch as claimed in claim 2 wherein said circuit board assembly further comprises a second capacitor connected in parallel to said first capacitor, said first and second capacitors being adapted to induct said relay means.

4. A flasher switch as claimed in claims 2 or 3 wherein said circuit board assembly further comprises at least one diode to suppress discharge of said first and second capacitors across the load terminal.

5. A flasher switch as claimed in claim 2 further comprising means for enhancing the audible signal generated upon movement of said contact between said first and second positions.

6. A flasher switch as claimed in claim 5 wherein said enhancement means comprise a flexible metal member adapted to strike said enclosure means upon engagement of said member by said contact.

7. A flasher switch as claimed in claim 5 wherein said enhancement means comprise buzzer means adapted to be activated upon movement of said contact between said first and second positions.

8. A flasher switch as claimed in claims 6 or 7 wherein said circuit board assembly further comprises at least one diode to suppress discharge of said first capacitor across the load terminal.

9. A flasher switch as claimed in claims 1, 2, or 3 wherein said relay means comprise a conductive yoke, conductive means connecting said yoke to said load terminal; a conductive armature biasingly connected to said yoke, and wherein said contact is connected to said armature thereby forming a conductive path between said load terminal and said contact.

10. A flasher switch as claimed in claims 5, 6, or 7 wherein said relay means comprise a conductive yoke conductive means connecting said yoke to said load terminal; a conductive armature biasingly connected to said yoke, and wherein said contact is connected to said armature thereby forming a conductive path between said load terminal and said contact.

11. A flasher switch as claimed in claim 1 wherein said conductive member is further adapted to prevent movement of said contact between said first and second positions upon reduction of load through said load terminal.

* * * * *